United States Patent
Eo et al.

(10) Patent No.: US 10,914,879 B2
(45) Date of Patent: Feb. 9, 2021

(54) LIQUID-CRYSTAL DISPLAY DEVICE HAVING POLARIZING PLATE FOR REDUCING SMUDGES

(71) Applicant: LG Display Co., Ltd., Seoul (KR)

(72) Inventors: Yoonjung Eo, Paju-si (KR); Sumin Lee, Seoul (KR); Hyunseung Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 170 days.

(21) Appl. No.: 15/707,770

(22) Filed: Sep. 18, 2017

(65) Prior Publication Data

US 2018/0095210 A1    Apr. 5, 2018

(30) Foreign Application Priority Data

Sep. 30, 2016    (KR) .................. 10-2016-0126795

(51) Int. Cl.
G02B 5/30    (2006.01)
G02F 1/1335    (2006.01)

(52) U.S. Cl.
CPC .......... *G02B 5/3016* (2013.01); *G02B 5/305* (2013.01); *G02B 5/3041* (2013.01); *G02F 1/133504* (2013.01)

(58) Field of Classification Search
CPC combination set(s) only.
See application file for complete search history.

(56) References Cited

U.S. PATENT DOCUMENTS

| | | | |
|---|---|---|---|
| 5,617,941 A | 4/1997 | Takahashi et al. | |
| 2006/0093809 A1* | 5/2006 | Hebrink | C09D 5/20 428/323 |
| 2007/0231507 A1* | 10/2007 | Sugiyama | C08J 5/18 428/1.31 |
| 2011/0242654 A1* | 10/2011 | Asahi | C09D 127/20 359/488.01 |
| 2013/0100367 A1* | 4/2013 | Takahashi | B29D 11/00788 349/15 |

FOREIGN PATENT DOCUMENTS

| | | |
|---|---|---|
| CN | 1266489 C | 7/2006 |
| CN | 1807343 A | 7/2006 |
| EP | 0 992 861 A2 | 4/2000 |
| KR | 2014-0101954 A | 8/2014 |

OTHER PUBLICATIONS

Chinese Office Action dated Sep. 19, 2019 issued in a Chinese patent application No. 201710898300.X. (6 pages) and English translation (7 pages).

* cited by examiner

*Primary Examiner* — Lauren Nguyen
(74) *Attorney, Agent, or Firm* — Polsinelli PC

(57) ABSTRACT

A polarizing plate and a liquid crystal display device are provided which can prevent abrasion since the roughness and coefficient of friction of an outer base material of a polarizing plate are designed depending on the surface hardness of the outer base material by conducting studies and tests that are conducted into factors causing abrasion between the polarizing plate and an optical sheet and taking the results into account. Therefore, the problem of abrasion between the polarizing plate and the optical sheet associated with slim-profile liquid-crystal display devices can be solved, thereby achieving a slim design without cost increase.

5 Claims, 15 Drawing Sheets

FIG. 4

| HARDNESS | B | HB | H | 2H | 3H | 4H | 5H |
|---|---|---|---|---|---|---|---|
| COEFFICIENT OF (KINETIC) FRICTION | \multicolumn{7}{c|}{0.009} |
| SURFACE ROUGHNESS | \multicolumn{7}{c|}{0.167} |
| VIBRATION TESTING | 5 LEVEL | 3 LEVEL | 2 LEVEL | 1 LEVEL | 1 LEVEL | 1 LEVEL | 1 LEVEL |
| PRODUCT EVALUATION | × | × | ○ | ○ | ○ | ○ | ○ |

FIG. 5

| LEVEL | 1 | 2 | 3 | 4 | 5 |
|---|---|---|---|---|---|
| CRITERION FOR EVALUATION (MATLAB) | 0 | <30 | 30~300 | 300~750 | 750< |
| PRODUCT EVALUATION | ○ | | × | | |

LIQUID-CRYSTAL DISPLAY DEVICE HAVING POLARIZING PLATE FOR REDUCING SMUDGES

CROSS-REFERENCE TO RELATED APPLICATION

Pursuant to 35 U.S.C. § 119(a), this application claims the benefit of an earlier filing date of and the right of priority to Korean Application No. 10-2016-0126795, filed on Sep. 30, 2016, the contents of which are incorporated by reference herein in its entirety.

BACKGROUND

Field of the Disclosure

The present disclosure relates to a display device, and more particularly, to a polarizing plate and a liquid-crystal display device having the same. Although the present disclosure has a wide scope of applications, it is particularly suitable for a liquid-crystal display device with a slim profile and narrow bezel, and a liquid-crystal display device having the same.

Description of the Background

Recently, with the growing interest in information displays and the increasing demand for use of portable information mediums, research and commercialization of flat-panel displays (FPD) replacing traditional cathode ray tubes (CRTs) have been conducted intensively.

Notably, among these flat-panel displays, liquid-crystal displays (LCD) are devices that display images using the optical anisotropy of liquid crystals, and have been actively used for applications such as laptops and desktop monitors because of their high resolution, excellent color reproduction, and high picture quality.

Hereinafter, a structure of a typical liquid-crystal display device will be described in detail with reference to the drawings.

FIG. 1 is a cross-sectional view schematically showing a structure of a typical liquid-crystal display device, for example, a liquid-crystal display device with a direct-lit backlight unit.

Referring to FIG. 1, a typical liquid-crystal display device includes a liquid crystal panel 10 and a backlight unit placed on the back of the liquid crystal panel 10 to provide light to the liquid-crystal display panel 10.

Although not shown in detail, the liquid crystal panel 10 is an area where an image is actually produced, and includes a first substrate, which is transparent like glass, a second substrate, and a liquid crystal layer formed between the first and second substrates.

The first substrate is often referred to as a color filter substrate where color filters are placed, and the second substrate is often referred to as a TFT substrate where driving elements such as thin-film transistors and pixel electrodes are placed. A driver circuit portion is provided on the side of the second substrate to apply signals to the thin-film transistors and pixel electrodes on the second substrate.

The backlight unit includes a plurality of lamps 44 that emit light, a reflector 43 that improves light efficiency by reflecting the light emitted from the lamps 44 toward the liquid crystal panel 10, and an optical sheet 41 located over the reflector 43 and made up of a diffuser sheet and a prism sheet.

In this instance, the direct-lit backlight unit, which uses no light guide plate, has a diffuser plate 42 between the lamps 44 and the optical sheet 41 to diffuse light from a light source and support the optical sheet 41.

Polarizing plates 1 and 11 are located on the upper and lower sides of the liquid crystal panel 10.

Light emitted from the backlight unit is polarized at the second polarizing plate 11 attached to the second substrate, and the polarization state of the light is changed as it passes through the liquid crystal layer. This light is then sent out through the first polarizing plate 1 attached to the first substrate. Due to the change in the polarization state of the light induced by the liquid crystal layer, the transmittance of the light transmitted through the first polarizing plate 1 is adjusted, thereby displaying an image.

The liquid crystal panel 10 including the first and second substrates is seated on top of the thus-constructed backlight unit, through a panel guide 45. The liquid crystal panel 10, the panel guide 45, and the backlight unit are joined together by a cover bottom 50 on the bottom and a case top 55 on the top, by using a plurality of fastening means.

In line with the recent trend in displays, it is important that liquid-crystal displays have a slim profile and a narrow bezel. This inevitably means that the distance between the liquid crystal panel 10 and the backlight unit needs to be minimized.

Thus, the liquid crystal panel 10 and the optical sheet 41 are directly in contact with each other when liquid-crystal display products are subjected to be joggled while in transit. This increases the friction caused by the contact between the second polarizing plate 11 on the lower side and the optical sheet 41, thereby causing the second polarizing plate 11 to be abraded, leaving behind smudges.

Due to the contact between the second polarizing plate 11 and the optical sheet 41, caused by the vibration of the liquid-crystal display device, particles will come off from the second polarizing plate 11, which is lower in hardness, especially the surface of the outer layer of protection. These particles act as impurities which cause abrasion of the second polarizing plate 11 and optical sheet 41.

Up until these days, to cope with this problem, a low-haze surface-treated layer is being added to the outer side of the second polarizing plate 11. However, this additional process and material can increase costs by about 10%, so continuous efforts have been made to develop low-cost surface treatment materials or abrasion-resistant materials.

SUMMARY

The present disclosure has been made in an effort to provide a polarizing plate that can reduce smudges caused by abrasion of the polarizing plate and a liquid-crystal display device having the same.

Other aspects and features of the present disclosure will become apparent to those ordinarily skilled in the art upon reviewing the following description of aspects of the present disclosure and the claims.

An exemplary aspect of the present disclosure provides a polarizing plate including: a polarizer and an outer base material provided on one side of the polarizer, wherein the outer base material has a surface hardness of H to 4H, and roughness and coefficient of friction of the outer base material are set depending on the degree of the surface hardness.

The outer base material may have a surface hardness of 4H and, at the same time, a roughness less than 0.564 μm and a coefficient of friction lower than 0.064, or a roughness of 0.434 μm or less and a coefficient of friction of 0.057 or lower, or a roughness of 0.01 to 0.349 μm and a coefficient of friction of 0.001 to 0.027.

The outer base material may have a surface hardness of 3H and, at the same time, a roughness less than 0.434 μm and a coefficient of friction lower than 0.057, or a roughness of 0.349 μm or less and a coefficient of friction of 0.042 or lower, or a roughness of 0.01 to 0.228 μm and a coefficient of friction of 0.001 to 0.018.

The outer base material may have a surface hardness of 2H and, at the same time, a roughness less than 0.349 μm and a coefficient of friction lower than 0.042, or a roughness of 0.228 μm or less and a coefficient of friction of 0.027 or lower, or a roughness of 0.01 to 0.228 μm and a coefficient of friction of 0.001 to 0.009.

The outer base material may have a surface hardness of H and, at the same time, a roughness less than 0.228 μm and a coefficient of friction lower than 0.027, or a roughness of 0.167 μm or less and a coefficient of friction of 0.018 or lower, or a roughness of 0.01 to 0.167 μm and a coefficient of friction of 0.001 to 0.009.

Beads may be added into the outer base material.

The beads may be placed on a surface of the outer base material.

Another exemplary aspect of the present disclosure provides a liquid-crystal display device including: the polarizing plate with the above properties attached to an outer side of a liquid crystal panel and an optical sheet on an outer side of the polarizing plate.

If the surface hardness of the outer base material minus the surface hardness of the optical sheet equals H, the difference in surface roughness between the optical sheet and the outer base material may be 2.96 or more, preferably 3.0 or more, more preferably 3.15 or more.

If the surface hardness of the outer base material and the surface hardness of the optical sheet are equal, the difference in surface roughness between the optical sheet and the outer base material may be 3.0 or more, preferably 3.15 or more, more preferably 3.27 or more.

If the surface hardness of the outer base material minus the surface hardness of the optical sheet equals H, the difference in surface roughness between the optical sheet and the outer base material may be 3.15 or more, preferably 3.27 or more.

If the surface hardness of the outer base material minus the surface hardness of the optical sheet equals 2H, the difference in surface roughness between the optical sheet and the outer base material may be 3.27 or more, preferably 3.33 or more.

As described above, a polarizing plate and a liquid-crystal display device according to the present disclosure may prevent abrasion since the roughness and coefficient of friction of the outer base material of the polarizing plate are designed depending on the surface hardness of the outer base material.

BRIEF DESCRIPTION OF THE DRAWINGS

The accompanying drawings, which are included to provide a further understanding of the disclosure and are incorporated in and constitute a part of this specification, illustrate exemplary aspects and together with the description serve to explain the principles of the disclosure.

In the drawings:

FIG. 4 is a table showing, by way of example, the results of abrasion tests on a polarizing plate and an optical sheet with respect to the surface hardness of the polarizing plate;

FIG. 5 is a table showing, by way of example, a method of assessing the level of abrasion of the polarizing plate;

DETAILED DESCRIPTION

Figure 1:
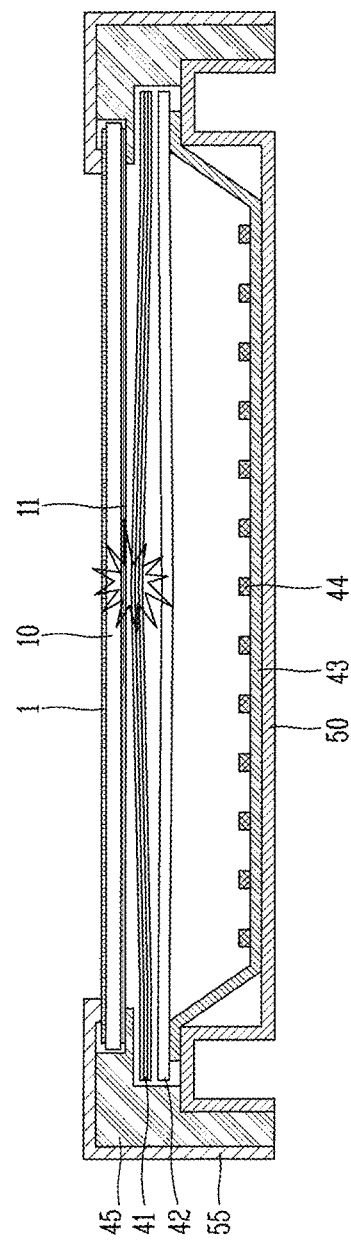
FIG. 1 is a cross-sectional view showing a structure of a typical liquid-crystal display device.

Hereinafter, a polarizing plate and a liquid-crystal display device having the same according to an exemplary aspect of the present disclosure will be described in sufficient detail to enable a person of ordinary skill in the art to readily practice the disclosure.

Advantages and features of the present disclosure and methods of accomplishing the same may be understood more readily by reference to the following detailed description of preferred aspects and the accompanying drawings. The present disclosure may, however, be embodied in many different forms and should not be construed as being limited to the aspects set forth herein. Rather, these aspects are provided so that this disclosure will be thorough and complete and will fully convey the concept of the disclosure to those skilled in the art, and the present disclosure will only be defined by the appended claims. Like numbers refer to like elements throughout the specification. In the drawings, the sizes and relative sizes of layers and regions may be exaggerated for clarity.

It will be understood that when an element or a layer is referred to as being "on" or "above" another element or layer, it can be directly on or above the other element or layer or intervening elements or layers may be present. In contrast, when an element or a layer is referred to as being "directly on" or "directly above" another element or layer, there are no intervening elements or layers present.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if an element illustrated in the drawings is turned over, the element described to be "below" or "beneath" another element may be put "above" the other element. Accordingly, the exemplary wording "below" may include both directions corresponding to "below" and "above".

The terms used in the present specification are used to describe example aspects of inventive concepts, and not to limit the inventive concepts. A singular form may include a plural form, unless otherwise defined. The terms "comprise" and/or "comprising" specify the existence of mentioned components, steps, operations and/or elements thereof, and do not exclude the existence or addition of one or more components, steps, operations and/or elements thereof.

A liquid-crystal display device is driven by two opposite electrodes and a liquid crystal layer formed between them. Liquid crystal molecules in the liquid crystal layer may be driven by an electric field generated by applying a voltage to the two electrodes.

The liquid crystal molecules have polarizability and optical anisotropy. Polarizability refers to the tendency of charges in a liquid crystal molecule in an electric field to be concentrated on two sides of the liquid crystal molecule and change the orientation of the molecule with respect to the electric field. Optical anisotropy refers to changing the path or polarization state of outgoing light depending on the incident direction or polarization state of incoming light due to the long, thin shape of a liquid crystal molecule and the above molecular orientation.

Thus, the liquid-crystal display essentially includes a liquid crystal panel, the liquid crystal panel being made up of a pair of transparent insulating substrates where field generating electrodes are respectively formed on opposite sides with a liquid crystal layer in between. The orientation of liquid crystal molecules is artificially controlled by changing the electric field between the field generating electrodes. Hereupon, the light transmittance changes, thus displaying various images.

In this instance, the polarizing plates located over and under the liquid crystal panel allow light to pass through when the light has a polarization component parallel to the their transmission axis. The degree of light transmission is determined by the configuration of the transmission axes of the two polarizing plates and the alignment of the liquid crystals.

Figure 2A:
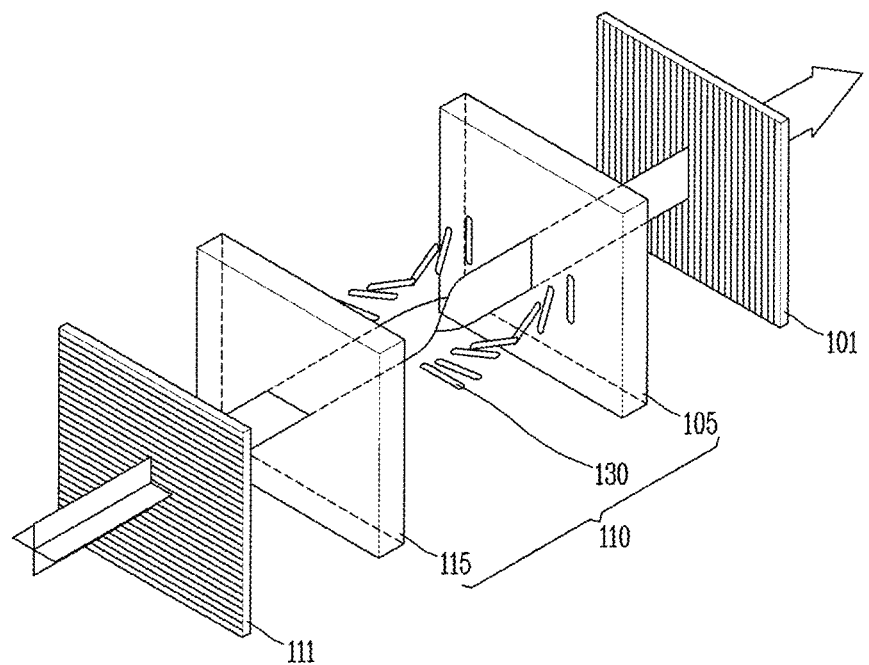
FIGS. 2A and 2B are illustrations of the properties of light passing through a liquid crystal panel.
Figure 2B:
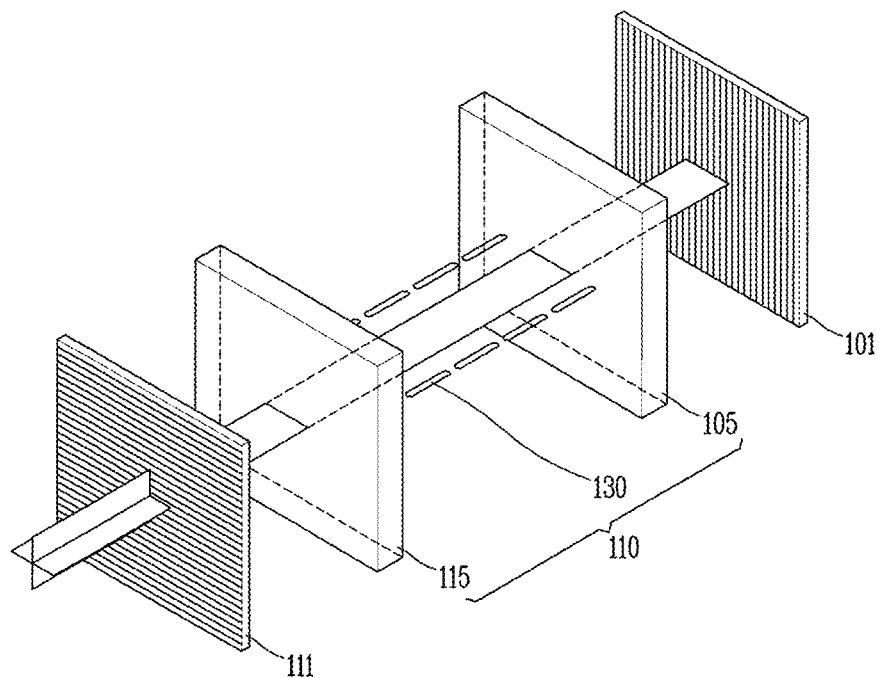

FIGS. 2A and 2B are illustrations of the properties of light passing through a liquid crystal panel.

Although FIGS. 2A and 2B illustrate the operation of a liquid crystal panel in twisted nematic (TN) mode by way of an example, the present disclosure is not limited to this example, and can be applicable to any one of liquid crystal modes, including STN (super TN), VA (vertical alignment), IPS (in-plane switching), FFS (fringe field switching), and OCB (optical compensation bend).

Referring to the drawings, a liquid-crystal display device may include a liquid crystal panel 110 and a backlight unit (not shown) providing light from behind the liquid crystal panel 110.

The liquid crystal panel 110 may include first and second substrates 105 and 115 joined together with a liquid crystal layer 130 in between, and first and second polarizing plates 101 and 111 respectively attached to the outer sides of the first and second substrates 105 and 115.

Although not shown, color filters for color representation and a common electrode can be provided on the inner side of the first substrate 105, and a plurality of pixels with transparent pixel electrodes and thin-film transistors controlling the turn on/off of the liquid crystal layer 130 driving voltage delivered to the pixel electrodes may be provided on the inner side of the second substrate 115.

In the TN (twisted nematic) mode, for example, when the voltage is in the off state, the molecules in the liquid crystal layer 130 interposed between the first and second substrates 105 and 115 are twisted at 90 degrees from the first substrate 105 to the second substrate 115 while their long axes are oriented parallel to the first and second substrates 105 and 115, and the polarization axes of the first and second polarizing plates 101 and 111 may be orthogonal to each other.

Since the liquid crystal panel 110 does not emit light itself, the backlight unit providing light to the liquid crystal panel 110 is located on the back of the liquid crystal panel 110.

In the liquid crystal panel 110, as shown in FIG. 2A, when the voltage is in the off state and light comes from the backlight unit, linearly polarized light parallel to the polarization axis is transmitted by the polarizing plate 111 and rotated at 90 degrees with respect to the liquid crystal layer 130 as it passes through the liquid crystal layer 130, allowing it to pass through the first polarizing plate 101 and display white, whereas light of other polarizations is absorbed.

Next, as shown in FIG. 2B, when the voltage is in the on state, the long axes of the liquid crystal molecules in the liquid crystal panel 110 are aligned perpendicular to the first and second polarizing plates 101 and 111 and their 90-degree optical rotatory power is lost, and the linearly polarized light transmitted through the second polarizing plate 111 is blocked by the first polarizing plate 101, thereby allowing it to display black.

Figure 3A:
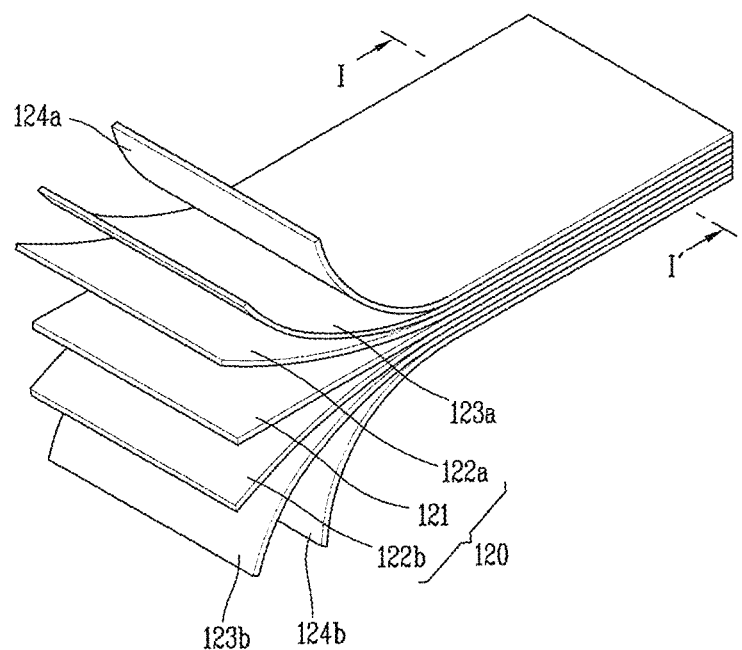
FIGS. 3A and 3B are respectively an exploded perspective view and a cross-sectional view schematically showing the elements of a polarizing plate according to an exemplary aspect of the present disclosure.
Figure 3B:
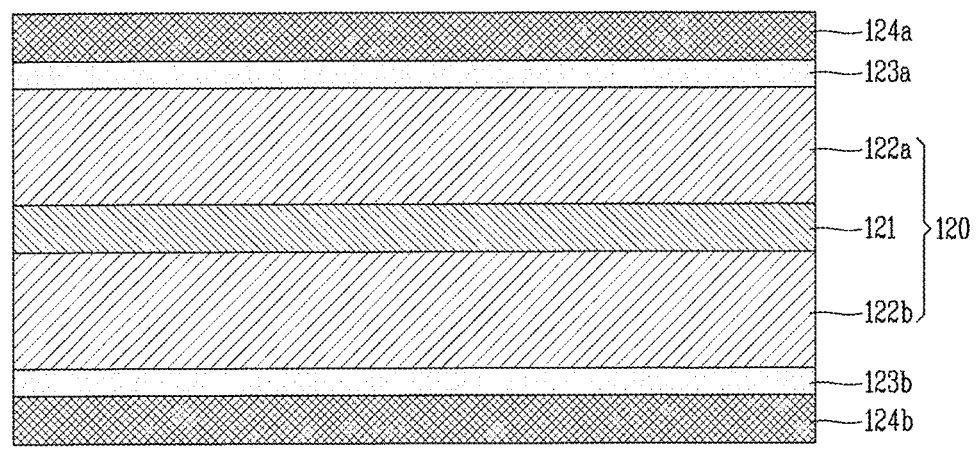

FIGS. 3A and 3B are respectively an exploded perspective view and a cross-sectional view schematically showing the elements of a polarizing plate according to an exemplary aspect of the present disclosure.

FIG. 3B schematically shows a cross-section taken along line I-I' of the elements of the polarizing plate of FIG. 3A according to an exemplary aspect of the present disclosure.

Referring to FIGS. 3A and 3B, the polarizing plate 120 according to an exemplary aspect of the present disclosure may include a polarizer 121 and protective layers 122a and 122b formed on either side of the polarizer 121.

The polarizing plate 120 is a typical polarizing element which allows light with a plane of vibration in a certain direction, out of natural light with a plane of vibration at 360 degrees in all directions and absorbs other unwanted light to thereby create polarized light.

Typically, a beam of light is split into a polarization component perpendicular to the plane of incidence and a polarization component parallel to the plane of incidence by using the polarizer 121 with light absorption characteristics. The polarizer 121 can be used to create linearly polarized light and elliptically polarized light.

To this end, appropriate materials may be selected and processed into a form of film according to their use so as to have a uniform polarizability and high polarization efficiency.

In an example, a polyvinyl alcohol (PVA) film treated with iodine may be used as the polarizer 121, and the protective layers 122a and 122b for protecting PVA films may be made from a triacetate cellulose (TAC) film or acrylic—for example, a polymethyl methacrylate (PMMA) film—which are stable in dimensions or against deformation, wear-resistant and high in transparency, ultraviolet absorptivity, and durability. However, the present disclosure is not limited to these materials.

Moreover, a deformed film 124a and a protective film 124b may be attached to protect the polarizer 121 and the protective layers 122a and 122b bonded together.

The deformed film 124a may be attached to the outer side of the first protective layer 122a until the polarizing plate 120 is attached to the final product, and the protective film 124b may be attached to the outer side of the second protective layer 122b in order to prevent scratches on the surface of the polarizing plate 120 until the polarizing plate 120 is attached to the final product.

The deformed film 124a and the first protective layer 122a may be bonded with an adhesive 123a, and the side from which the deformed film 124a is removed may be attached to the final product. On the contrary, the second protective layer 122b with the protective film 124b may not need the adhesive 123b thereto.

The polarizer 120 thus may be configured to be attached to the upper and lower sides of the liquid crystal panel. That is, the side of the polarizer 120 from which the deformed film 124a is removed may be attached to the upper and lower sides of the liquid crystal panel.

In addition, the polarizing plate 120, when attached to the upper side of the liquid crystal panel, may include a reinforced substrate for protecting the liquid crystal panel from the external impact.

The reinforced substrate may be made of tempered glass about 3 mm thick to protect the liquid crystal panel within it from external impact. Tempered glass is a type of glass that is manufactured by heating a formed sheet of glass to a near-softening temperature of 500 to 600° C., rapidly cooling it with compressed cold air, and putting the outer surfaces into compression and the inner surfaces into tension. In comparison to regular glass, tempered glass has 3 to 5 times higher bending strength and 3 to 8 times greater shock resistance and also exhibits high thermal resistance.

The polarizing plate 120 according to an exemplary aspect of the present disclosure is attached to the upper and lower sides of the liquid crystal panel. Although not shown, the liquid crystal panel according to an exemplary aspect of the present disclosure may include a color filter substrate, an array substrate, and a liquid crystal layer formed between the color filter substrate and the array substrate, with a cell gap maintained between them by a column spacer.

The color filter substrate may include a color filter consisting of a plurality of sub-color filters, a black matrix that separates the sub-color filters and blocks light transmitted through the liquid crystal layer, and a transparent common electrode that applies a voltage to the liquid crystal layer.

The array substrate may include a plurality of gate lines and data lines arranged horizontally and vertically and defining a plurality of pixel regions, thin-film transistors formed at the intersections of the gate lines and data lines and acting as switching elements, and pixel electrodes formed in the pixel regions.

Each thin-film transistor may include a gate electrode connected to a gate line, a source electrode connected to a data line, and a drain electrode electrically connected to a pixel electrode. Further, the thin-film transistor may include an active layer that forms a conductive channel between the source electrode and the drain electrode by a gate voltage supplied to the gate electrode.

Such a liquid crystal panel has a backlight unit on the back to provide light. The liquid crystal panel requires a separate light source because the liquid-crystal display device itself has no light-emitting element.

For example, the light source may be any one of the following: a CCFL (cold cathode fluorescent lamp), an EEFL (external electrode fluorescent lamp), an HCFL (hot cold fluorescent lamp), and an LED (light-emitting diode).

As described above, the distance between the liquid crystal panel and the backlight unit is reduced by allowing for a slim-profile and a narrow-bezel for the liquid-crystal display device.

In this regard, the polarizing plate 120 according to an exemplary aspect of the present disclosure is characterized in that, depending on the surface hardness of the protective layers 122a and 122b on the outer side, particularly, the second protective layer 122b (hereinafter, referred to as "outer base material") with the attached protective film 124b, the roughness and coefficient of friction of the outer base material 122b are designed, in order to improve the problem of abrasion of the polarizing plate 120 due to the reduced distance between the liquid crystal panel and the backlight unit.

To this end, studies and tests were conducted into factors causing abrasion between the polarizing plate and an optical sheet.

It was found out that abrasion of the polarizing plate occurs mostly because the polarizing plate is more fragile than the optical sheet.

Moreover, it was found out that the factors of abrasion of the polarizing plate in order of importance are surface hardness, roughness, and coefficient of friction.

The surface hardness can be measured by comparing coating hardness against pencil hardness. The roughness Ra is the arithmetic average of surface irregularities determined from deviations about the mean line within a reference length sampled from a roughness curve. Ra is specified in μm.

The coefficient of (kinetic) friction is the ratio of the force of friction opposing the motion of a moving sample and the vertical force.

In the present disclosure, taking these results into account, the roughness and coefficient of friction of the outer base material of the polarizing plate may be designed depending on the surface hardness of the outer base material, in order to prevent abrasion. This will be described in detail with reference to the drawings.

FIG. 4 is a table showing, by way of example, the results of abrasion tests on the polarizing plate and an optical sheet with respect to the surface hardness of the polarizing plate.

The abrasion test results shown in FIG. 4 were from physical property data of a single product, when 1.5 G of vibration was applied for 1 hour, by way of example.

Moreover, FIG. 4 shows, by way of example, the results of abrasion tests on the polarizing plate and the optical sheet at varying degrees of surface hardness from B to 5H, after the coefficient of friction and surface roughness of the outer base material of the polarizing plate are fixed at 0.009 and 0.228 μm.

FIG. 5 is a table showing, by way of example, a method of assessing the level of abrasion of the polarizing plate.

The abrasion level may be assessed by the vibration test by the number of pixels in a portion where an abrasion occurs. For example, Level 1 means no abrasions at all, Level 2 means less than 30 abrasions, Level 3 means 30 to 300 abrasions, and Level 4 means 300 to 750 abrasions. Finally, Level 5 means more than 750 abrasions.

For example, products of Levels 1 and 2 may be rated as OK, and products of Levels 3, 4, and 5 may be rated as NG (i.e., no good).

Figure 6A:
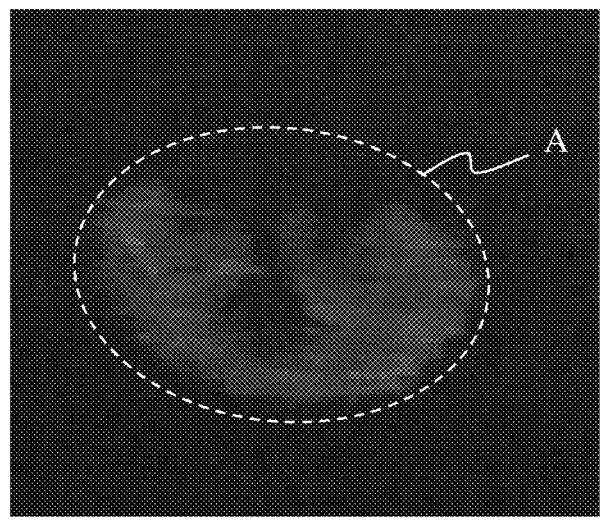
FIGS. 6A and 6B are photographs showing, by way of example, the results of an abrasion test on the polarizing plate and the optical sheet, when the polarizing plate has a surface hardness of B.
Figure 6B:
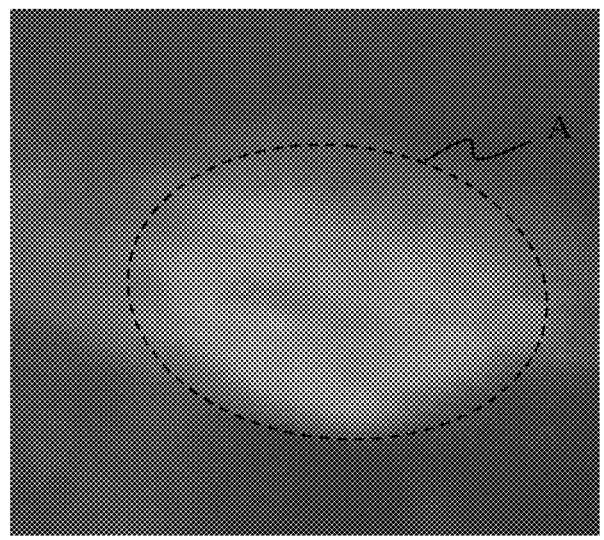

As shown as an example, from FIGS. 6A and 6B to FIGS. 12A and 12B, there are photographs of the results of abrasion tests on the polarizing plate and the optical sheet with respect to the surface hardness of the polarizing plate. More specifically, FIGS. 6A and 6B are photographs showing, by way of example, the results of an abrasion test on the polarizing plate and the optical sheet, when the polarizing plate has a surface hardness of B. FIGS. 7A and 7B are photographs showing, by way of example, the results of an abrasion test on the polarizing plate and the optical sheet, when the polarizing plate has a surface hardness of HB. FIGS. 8A and 8B are photographs showing, by way of example, the results of an abrasion test on the polarizing plate and the optical sheet, when the polarizing plate has a surface hardness of H.

Figure 9A:
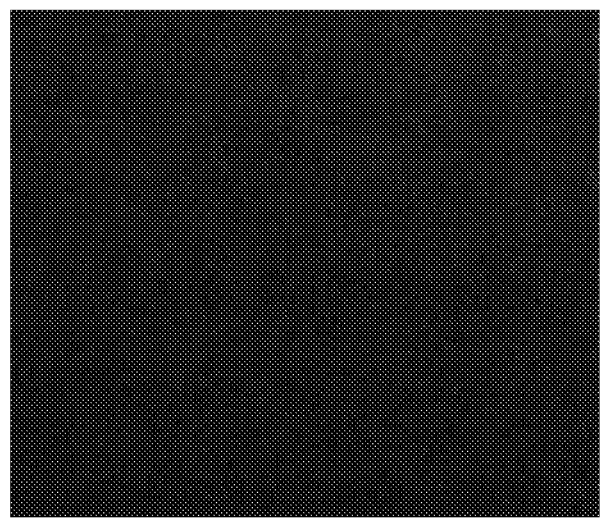
FIGS. 9A and 9B are photographs showing, by way of example, the results of an abrasion test on the polarizing plate and the optical sheet, when the polarizing plate has a surface hardness of 2H.
Figure 9B:
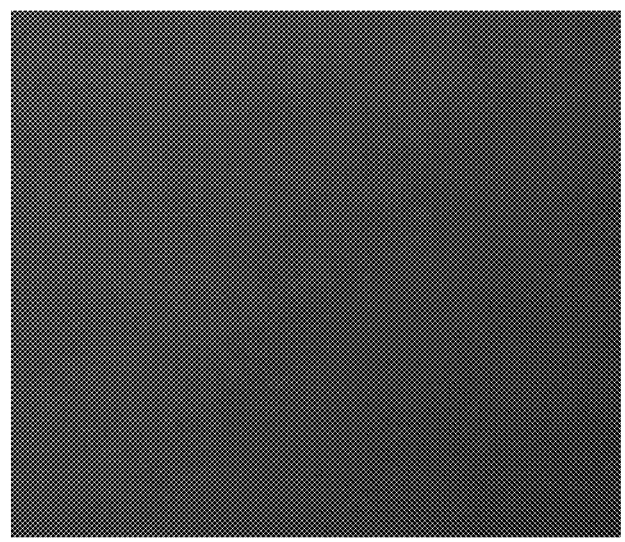
Figure 10A:
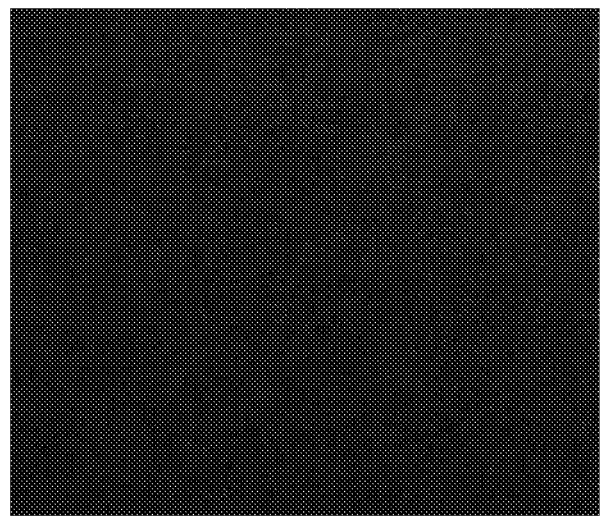
FIGS. 10A and 10B are photographs showing, by way of example, the results of an abrasion test on the polarizing plate and the optical sheet, when the polarizing plate has a surface hardness of 3H.
Figure 10B:
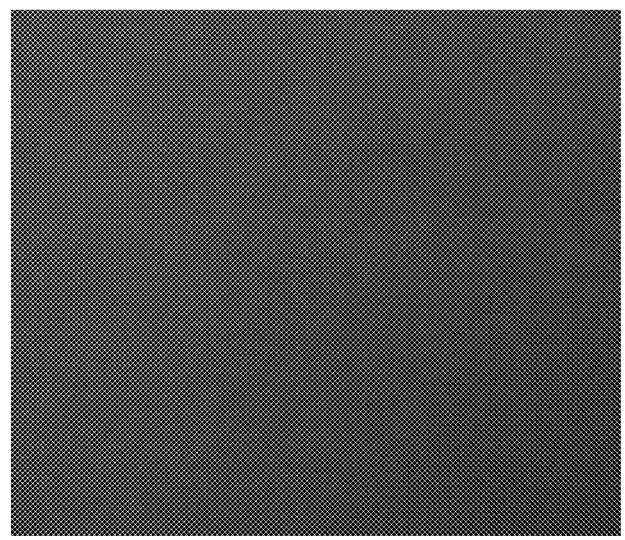

FIGS. 9A and 9B are photographs showing, by way of example, the results of an abrasion test on the polarizing plate and the optical sheet, when the polarizing plate has a surface hardness of 2H. FIGS. 10A and 10B are photographs showing, by way of example, the results of an abrasion test on the polarizing plate and the optical sheet, when the polarizing plate has a surface hardness of 3H.

Figure 11A:
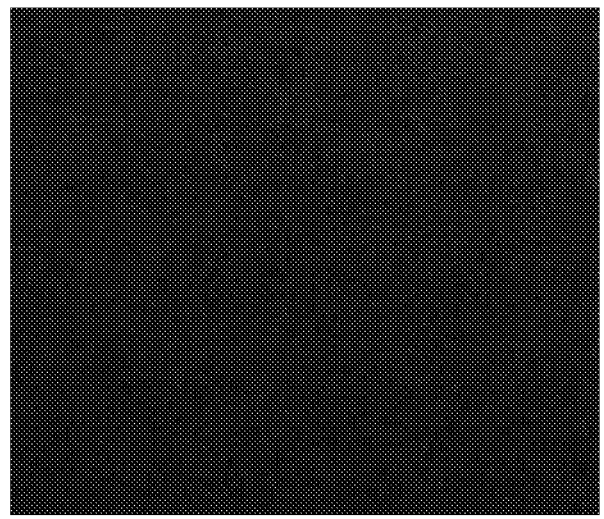
FIGS. 11A and 11B are photographs showing, by way of example, the results of an abrasion test on the polarizing plate and the optical sheet, when the polarizing plate has a surface hardness of 4H.
Figure 11B:
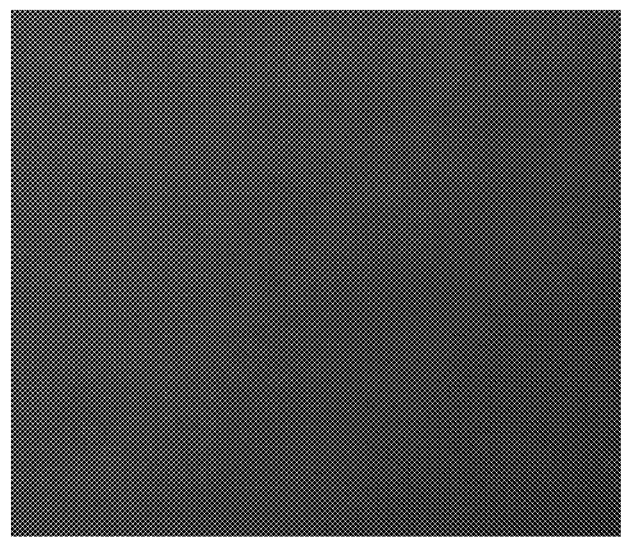
Figure 12A:
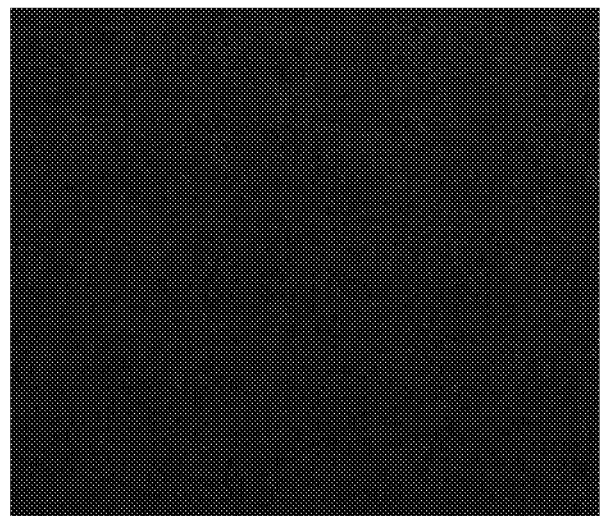
FIGS. 12A and 12B are photographs showing, by way of example, the results of an abrasion test on the polarizing plate and the optical sheet, when the polarizing plate has a surface hardness of 5H.
Figure 12B:
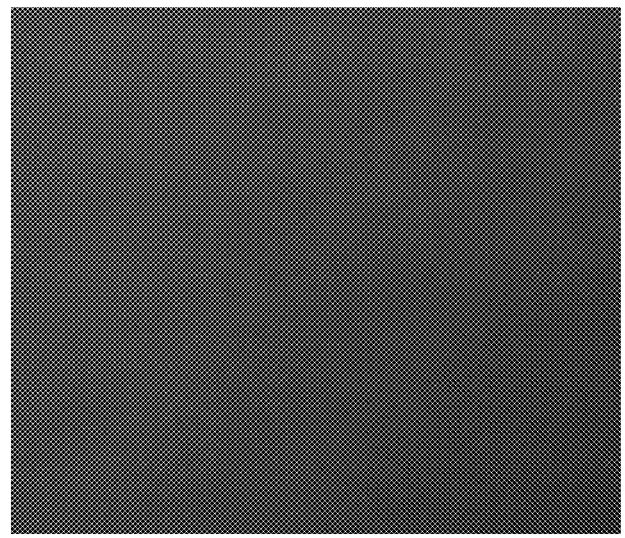

FIGS. 11A and 11B are photographs showing, by way of example, the results of an abrasion test on the polarizing plate and the optical sheet, when the polarizing plate has a surface hardness of 4H. FIGS. 12A and 12B are photographs showing, by way of example, the results of an abrasion test on the polarizing plate and the optical sheet, when the polarizing plate has a surface hardness of 5H.

Referring to FIGS. 4 and 5, when the outer base material had a surface hardness of B and HB, the vibration test result was Level 5 and Level 3, respectively, which may be rated as NG in product evaluation.

That is, referring to FIGS. 6A and 6B, it was revealed that, when the outer base material had a surface hardness of B, the polarizing plate and the optical sheet had severe abrasions (referred to as "A" in the FIGS. 6A and 6B) in the center.

Figure 7A:
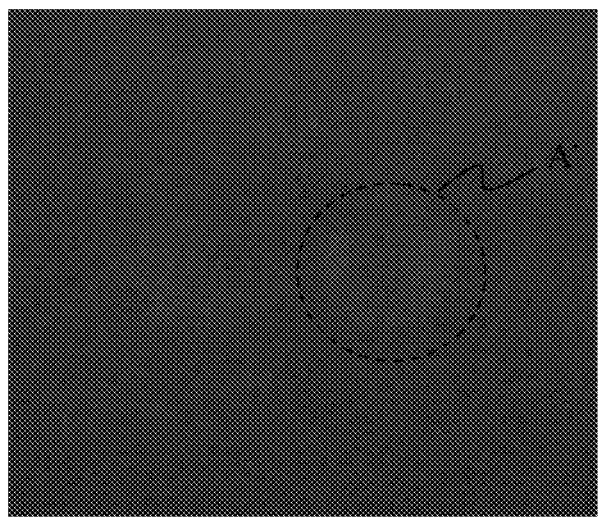
FIGS. 7A and 7B are photographs showing, by way of example, the results of an abrasion test on the polarizing plate and the optical sheet, when the polarizing plate has a surface hardness of HB.
Figure 7B:
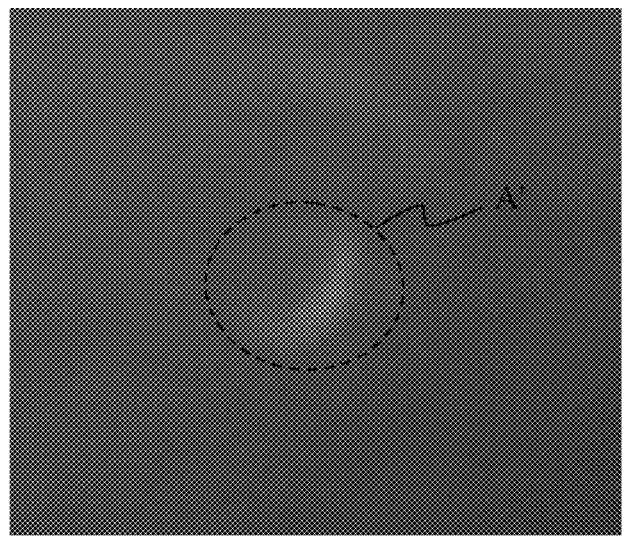

Referring to FIGS. 7A and 7B, it was revealed that, when the outer base material had a surface hardness of HB, the polarizing plate and the optical sheet had some abrasions (referred to as "A'" in the FIGS. 7A and 7B) in the center.

By contrast, when the outer base material had a surface hardness of H, the vibration testing result was Level 2, which may be rated as OK in product evaluation.

Figure 8A:
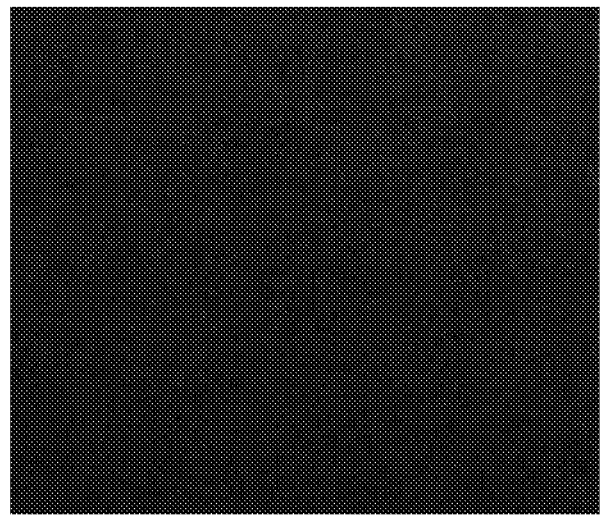
FIGS. 8A and 8B are photographs showing, by way of example, the results of an abrasion test on the polarizing plate and the optical sheet, when the polarizing plate has a surface hardness of H.
Figure 8B:
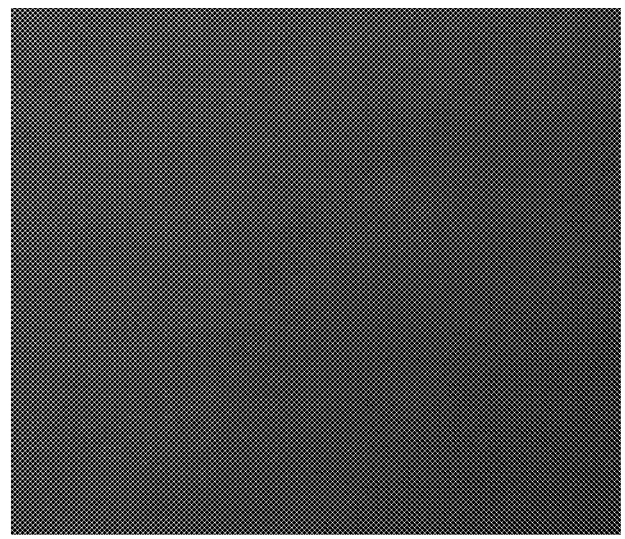

That is, referring to FIGS. 8A and 8B, it was revealed that, when the outer base material had a surface hardness of H, the polarizing plate and the optical sheet had almost no abrasions.

When the outer base material had a surface hardness of 2H to 5H, i.e., 2H or greater, the vibration testing result was Level 1, which may be rated as OK in product evaluation.

That is, referring to FIGS. 9A and 9B and FIGS. 12A and 12B, it was revealed that, when the outer base material had a surface hardness of 2H or greater, the polarizing plate and the optical sheet had almost no abrasions.

From the above described results, it can be seen that, when the coefficient of friction and surface roughness of the outer base material of the polarizing plate were fixed, the level of abrasion decreased as the surface hardness of the outer base material went up. This is because, with the increased surface hardness, very few particles came off that acted as impurities even if the polarizing plate made contact with the optical sheet due to vibration. However, the surface hardness of the outer base material cannot be set above 5H, because, apart from the cost issue, the outer base material will crack if it is too hard, thus causing problems with processability.

Next, the results of abrasion tests on the outer base material with respect to the roughness and the coefficient of friction at varying degrees of surface hardness will be described in detail.

The abrasion tests below were performed on an optical sheet, i.e., a diffuser sheet, having a surface hardness of 3H and a roughness of 3 to 3.5 μm.

First, although not shown, no abrasions occurred regardless of the roughness and coefficient of friction of the outer base material, when the outer base material had a surface hardness of 5H or greater.

Figure 13:
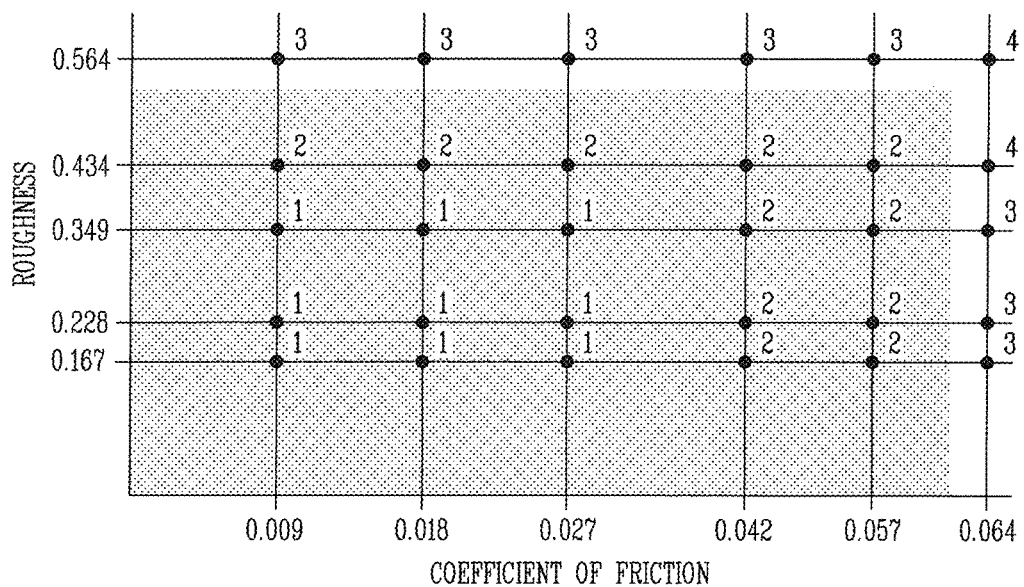
FIG. 13 is a graph showing, by way of example, the results of an abrasion test with respect to roughness and coefficient of friction, when the polarizing plate has a surface hardness of 4H.

When the outer base material had a surface hardness of HB or less, abrasions occurred regardless of the roughness and coefficient of friction of the outer base material, FIG. 13 is a graph showing, by way of example, the results of an abrasion test with respect to roughness and coefficient of friction, when the polarizing plate has a surface hardness of 4H.

The numbers indicated on the graph represent the levels of abrasion according to the results of the above-described vibration testing at different degrees of roughness and different coefficients of friction. The X-axis of the graph represents coefficient of friction, and the Y-axis of the graph represents roughness. Referring to FIG. 13, it can be seen that, when the outer base material had a surface hardness of 4H, the vibration test result was Level 1 or Level 2 if the coefficient of friction of the outer base material was lower than 0.064 (e.g., 0.009, 0.018, 0.027, 0.042, and 0.057) and its roughness was less than 0.564 µm (e.g., 0.167, 0.228, 0.349, and 0.434 µm). In this case, the products may be rated as OK.

Specifically, when the coefficient of friction of the outer base material was lower than 0.064 (e.g., 0.009, 0.018, 0.027, 0.042, and 0.057), the vibration testing result was Level 3 if the roughness was 0.564 µm.

When the coefficient of friction of the outer base material was 0.064, the vibration testing result was Level 4 if the roughness was 0.564 µm and 0.434 µm, and Level 3 if the roughness was less than 0.434 µm (e.g., 0.167, 0.228, and 0.349 µm).

When the coefficient of friction of the outer base material was 0.009, 0.018, and 0.027, the vibration testing result was Level 2 if the roughness was 0.434 µm, and Level 1 if the roughness was less than 0.434 µm (e.g., 0.167, 0.228, and 0.349 µm).

When the coefficient of friction of the outer base material was 0.042 and 0.057, the vibration testing result was Level 2 if the roughness was less than 0.564 µm (e.g., 0.167, 0.228, 0.349, and 0.434 µm).

From the above described results, when the outer base material has a surface hardness of 4H, the outer base material may be set to a roughness less than 0.564 µm and a coefficient of friction lower than 0.064, or, to a roughness of 0.434 µm or less and a coefficient of friction of 0.057 or lower, or, to a roughness of 0.01 to 0.349 µm and a coefficient of friction of 0.001 to 0.027.

Figure 14:
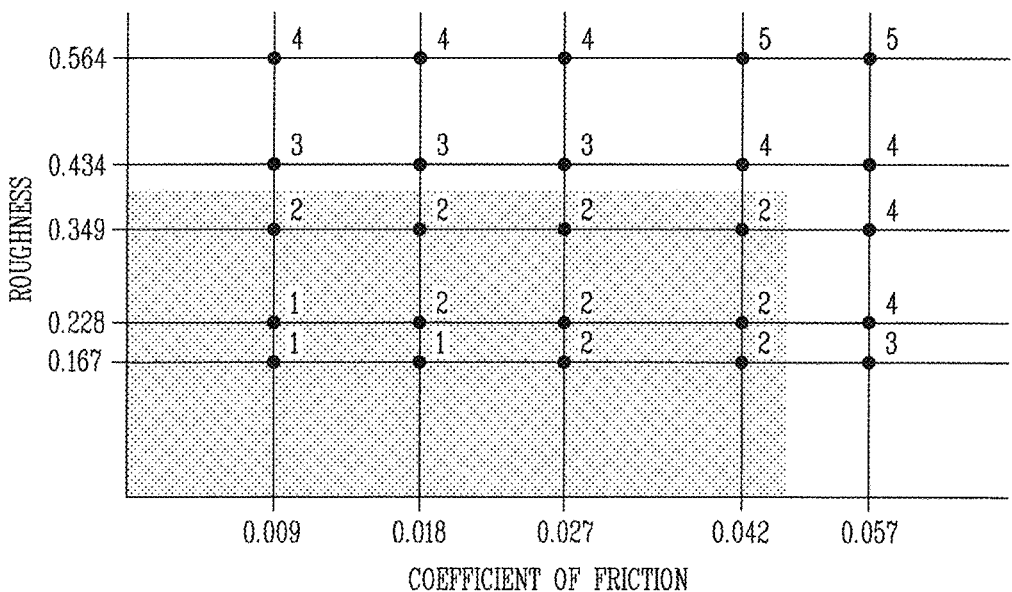
FIG. 14 is a graph showing, by way of example, the results of an abrasion test with respect to roughness and coefficient of friction, when the polarizing plate has a surface hardness of 3H.

Next, FIG. 14 is a graph showing, by way of example, the results of an abrasion test with respect to roughness and coefficient of friction, when the polarizing plate has a surface hardness of 3H.

As stated above, the numbers indicated on the graph represent the levels of abrasion according to the results of the above-described vibration testing at different degrees of roughness and different coefficients of friction. The X-axis of the graph represents coefficient of friction, and the Y-axis of the graph represents roughness.

Referring to FIG. 14, it can be seen that, when the outer base material had a surface hardness of 3H, the vibration testing result was Level 1 or Level 2 if the coefficient of friction of the outer base material was lower than 0.057 (e.g., 0.009, 0.018, 0.027, and 0.042) and its roughness was less than 0.434 µm (e.g., 0.167, 0.228, and 0.349 µm). In this case, the products may be rated as OK.

Specifically, when the coefficient of friction of the outer base material was 0.009, 0.018, and 0.027, the vibration testing result was Level 4 if the roughness was 0.564 µm, and Level 3 if the roughness was 0.434 µm.

When the coefficient of friction of the outer base material was 0.042 and 0.057, the vibration testing result was Level 5 if the roughness was 0.564 µm, and Level 4 if the roughness was 0.434 µm.

When the coefficient of friction of the outer base material was 0.057, the vibration testing result was Level 4 if the roughness was 0.349 and 0.228 µm, and Level 3 if the roughness was 0.167 µm.

When the coefficient of friction of the outer base material was 0.009, 0.018, and 0.027, the vibration testing result was Level 2 if the roughness was 0.349 µm. When the coefficient of friction of the outer base material was 0.042, the vibration testing result was Level 2 if the roughness was less than 0.434 µm (e.g., 0.167, 0.228, and 0.349 µm).

When the coefficient of friction of the outer base material was 0.009, the vibration testing result was Level 1 if the roughness was 0.228 µm. When the coefficient of friction of the outer base material was 0.018 and 0.027, the vibration testing result was Level 2 if the roughness was 0.228 µm.

When the coefficient of friction of the outer base material was 0.009 and 0.018, the vibration testing result was Level 1 if the roughness was 0.167 µm. When the coefficient of friction of the outer base material was 0.027, the vibration testing result was Level 2 if the roughness was 0.167 µm.

From the above described results, when the outer base material had a surface hardness of 3H, the outer base material may be set to a roughness less than 0.434 µm and a coefficient of friction lower than 0.057, or to a roughness of 0.349 µm or less and a coefficient of friction of 0.042 or lower, or to a roughness of 0.01 to 0.228 µm and a coefficient of friction of 0.001 to 0.018.

Figure 15:
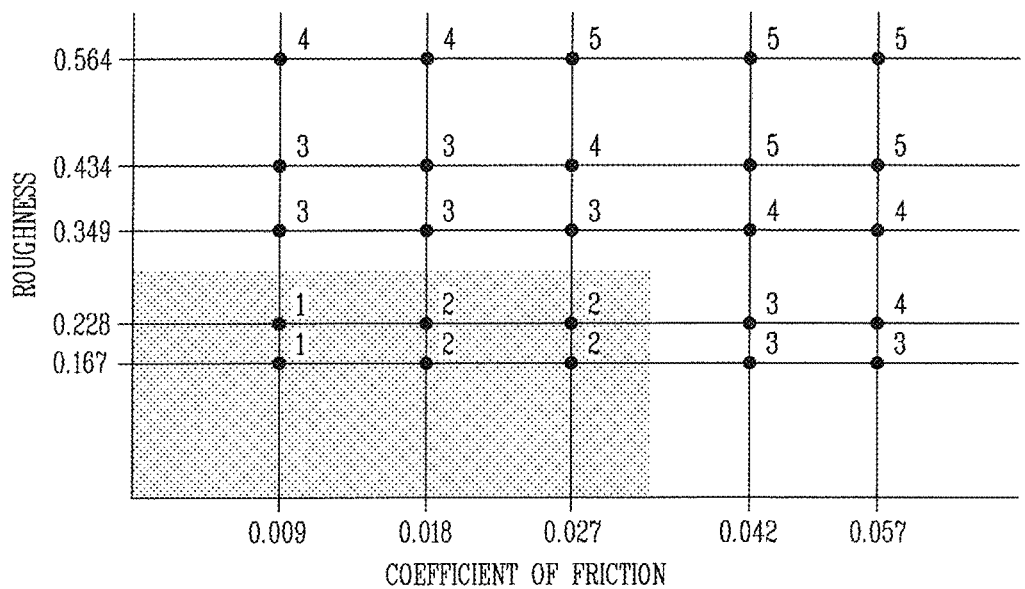
FIG. 15 is a graph showing, by way of example, the results of an abrasion test with respect to roughness and coefficient of friction, when the polarizing plate has a surface hardness of 2H.

Next, FIG. 15 is a graph showing, by way of example, the results of an abrasion test with respect to roughness and coefficient of friction, when the polarizing plate has a surface hardness of 2H.

As stated above, the numbers indicated on the graph represent the levels of abrasion according to the results of the above-described vibration testing at different degrees of roughness and different coefficients of friction. The X-axis of the graph represents coefficient of friction, and the Y-axis of the graph represents roughness.

Referring to FIG. 15, it can be seen that, when the outer base material had a surface hardness of 2H, the vibration testing result was Level 1 or Level 2 if the coefficient of friction of the outer base material was lower than 0.042 (e.g., 0.009, 0.018, and 0.027) and its roughness was less than 0.349 µm (e.g., 0.167 and 0.228 µm). In this case, the products may be rated as OK.

Specifically, when the coefficient of friction of the outer base material was 0.009 and 0.018, the vibration testing result was Level 4 if the roughness was 0.564 µm, and Level 3 if the roughness was 0.349 and 0.434 µm.

When the coefficient of friction of the outer base material was 0.027, 0.042, and 0.057, the vibration testing result was Level 5 if the roughness was 0.564 µm.

When the coefficient of friction of the outer base material was 0.027, the vibration testing result was Level 4 if the roughness was 0.434 µm, and Level 3 if the roughness was 0.349 µm.

When the coefficient of friction of the outer base material was 0.042 and 0.057, the vibration testing result was Level 5 if the roughness was 0.434 µm, and Level 4 if the roughness was 0.349 µm.

When the coefficient of friction of the outer base material was 0.042, the vibration testing result was Level 3 if the roughness was 0.228 µm. When the coefficient of friction of the outer base material was 0.057, the vibration testing result was Level 4 if the roughness was 0.228 µm.

When the coefficient of friction of the outer base material was 0.042 and 0.057, the vibration testing result was Level 3 if the roughness was 0.167 µm.

When the coefficient of friction of the outer base material was 0.009, the vibration test result was Level 1 if the roughness was less than 0.349 µm (e.g., 0.167 and 0.228 µm).

When the coefficient of friction of the outer base material was 0.018 and 0.027, the vibration test result was Level 2 if the roughness was less than 0.349 µm (e.g., 0.167 and 0.228 µm).

From above, when the outer base material has a surface hardness of 2H, the outer base material may be set to a roughness less than 0.349 µm and a coefficient of friction lower than 0.042, or to a roughness of 0.228 µm or less and a coefficient of friction of 0.027 or lower, or to a roughness of 0.01 to 0.228 μm and a coefficient of friction of 0.001 to 0.009.

Figure 16:
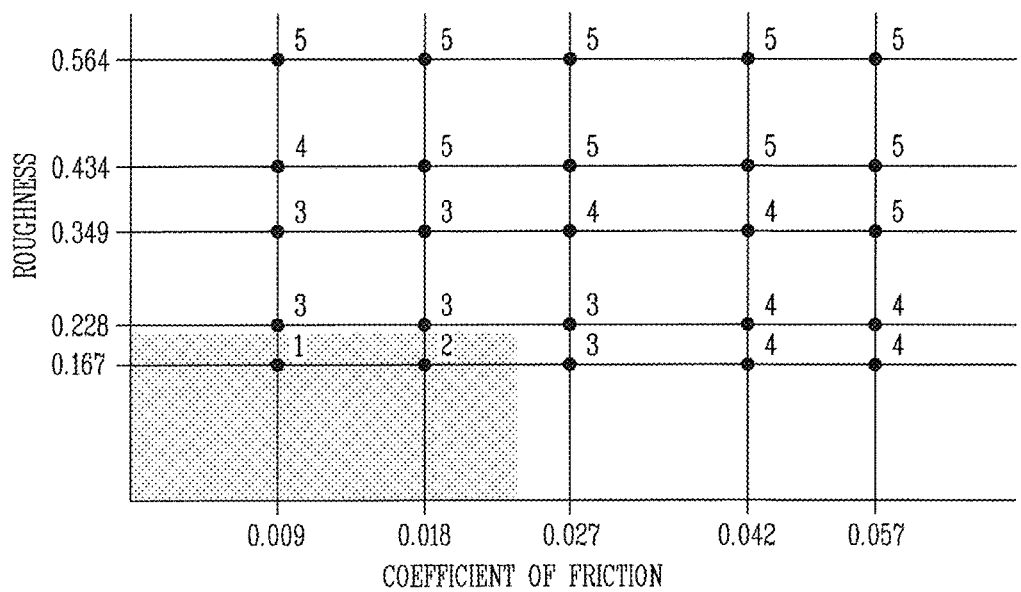
FIG. 16 is a graph showing, by way of example, the results of an abrasion test with respect to roughness and coefficient of friction, when the polarizing plate has a surface hardness of H.

Next, FIG. 16 is a graph showing, by way of example, the results of an abrasion test with respect to roughness and coefficient of friction, when the polarizing plate has a surface hardness of H.

As stated above, the numbers indicated on the graph represent the levels of abrasion according to the results of the above-described vibration test at different degrees of roughness and different coefficients of friction. The X-axis of the graph represents coefficient of friction, and the Y-axis of the graph represents roughness.

Referring to FIG. 16, it can be seen that, when the outer base material had a surface hardness of H, the vibration test result was Level 1 or Level 2 if the coefficient of friction of the outer base material was lower than 0.027 (e.g., 0.009 and 0.018) and its roughness was less than 0.228 μm (e.g., 0.167 μm). In this case, the products may be rated as OK.

Specifically, when the coefficient of friction of the outer base material was 0.009, 0.018, 0.027, and 0.042, the vibration test result was Level 5 if the roughness was 0.564 μm.

When the coefficient of friction of the outer base material was 0.009, the vibration test result was Level 4 if the roughness was 0.434 μm. When the coefficient of friction of the outer base material was 0.018, 0.027, 0.042, and 0.057, the vibration test result was Level 5 if the roughness was 0.434 μm.

When the coefficient of friction of the outer base material was 0.009 and 0.018, the vibration test result was Level 3 if the roughness was 0.349 and 0.228 μm.

When the coefficient of friction of the outer base material was 0.027 and 0.042, the vibration test result was Level 4 if the roughness was 0.349 μm. When the coefficient of friction of the outer base material was 0.057, the vibration test result was Level 5 if the roughness was 0.349 μm.

When the coefficient of friction of the outer base material was 0.027, the vibration test result was Level 3 if the roughness was 0.167 and 0.228 μm.

When the coefficient of friction of the outer base material was 0.042 and 0.057, the vibration test result was Level 4 if the roughness was 0.167 and 0.228 μm.

When the coefficient of friction of the outer base material was 0.009, the vibration test result was Level 1 if the roughness was 0.167 μm.

When the coefficient of friction of the outer base material was 0.018, the vibration test result was Level 2 if the roughness was 0.167 μm.

From above, when the outer base material has a surface hardness of H, the outer base material may be set to a roughness less than 0.228 μm and a coefficient of friction lower than 0.027, or to a roughness of 0.167 μm or less and a coefficient of friction of 0.018 or lower, or to a roughness of 0.01 to 0.167 μm and a coefficient of friction of 0.001 to 0.009.

The coefficient of friction of the outer base material may be set by adjusting the fluorine content, and about 0.1 to 1.0 wt % fluorine may be added. If the fluorine content is higher than 1.0 wt %, the coating properties degrade.

The coefficient of friction of the outer base material tends to decrease with increasing fluorine content.

Here, the fluorine may contain a fluorine-containing polymer. Examples of the fluorine-containing polymer may include hydrolysates and dehydration-condensates of perfluoroalkyl group-containing silane compounds, and fluorine-containing copolymers comprising fluorine-containing monomeric units and subunits for imparting crosslinking reactivity.

The surface roughness of the outer base material may be controlled by patterning via imprinting or by adding beads to it.

The beads may contain fine inorganic particles. Examples of these may include fine particles of magnesium fluoride or silica.

As stated above, surface roughness represents the arithmetic average of surface irregularities, and surface roughness tends to increase with increasing roughness.

From this, it can be seen that the permissible (selectable) ranges of the roughness and coefficient of friction of the outer base material increase as the surface hardness of the outer base material increases.

In this instance, the diffuser sheet usually has a surface roughness of 3H and a surface roughness of about 3 to 3.5.

Below, the presence or absence of abrasions with respect to the surface hardness of the outer base material compared to the surface hardness of the diffuser sheet will be described in detail.

First, assuming that the outer base material and the diffuser sheet have a surface hardness of H1 and H2, respectively, if H1−H2≥2H, no abrasions occur regardless of the roughness and coefficient of friction of the outer base material.

If H1−H2<2H, the presence or absence of abrasions depends on the roughness and coefficient of friction of the outer base material.

If H2−H1>2H, abrasions occur regardless of the roughness and coefficient of friction of the outer base material.

In the second case, for H1−H2=H, the difference in surface roughness between the diffuser sheet and the outer base material may be set to 2.96 or more, preferably 3.0 or more, or 3.15 or more.

For H1=H2, the difference in surface roughness between the diffuser sheet and the outer base material may be set to 3.0 or more, preferably 3.15 or more, or 3.27 or more.

For H2−H1=H, the difference in surface roughness between the diffuser sheet and the outer base material may be set to 3.15 or more, or 3.27 or more.

For H2−H1=2H, the difference in surface roughness between the diffuser sheet and the outer base material may be set to 3.27 or more, or 3.33 or more.

Moreover, the lower the coefficient of friction of the outer base material, the better, in order to prevent abrasion.

Meanwhile, in the present disclosure, the surface of the outer base material may be patterned via imprinting, or beads may be added into it, in order to control the surface roughness of the outer base material. This will be described in detail through the following second exemplary aspect of the present disclosure.

Figure 17:
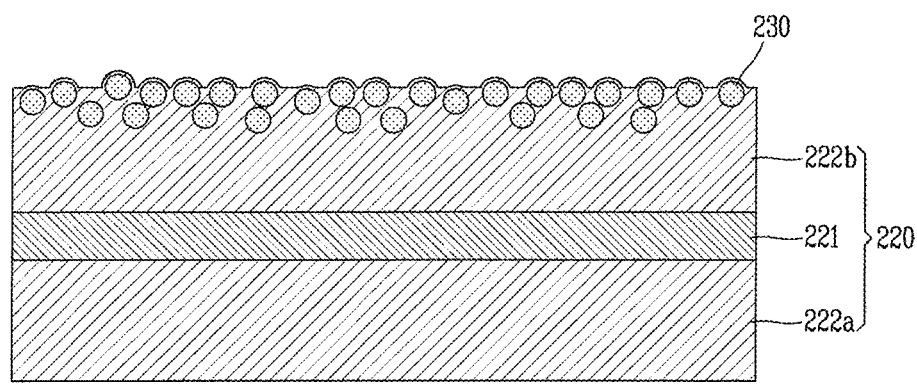
FIG. 17 is a cross-sectional view schematically showing the elements of a polarizing plate according to another exemplary aspect of the present disclosure.

FIG. 17 is a cross-sectional view schematically showing the elements of a polarizing plate according to another exemplary aspect of the present disclosure.

Referring to FIG. 17, the polarizing plate 220 according to an exemplary aspect of the present disclosure may include a polarizer 221 and protective layers 222a and 222b formed on either side of the polarizer 221.

As described above, the polarizing plate 220 is a typical polarizing element which allows light with a plane of vibration in a certain direction, out of natural light with a plane of vibration at 360 degrees in all directions and absorbs other unwanted light to thereby create polarized light.

In an example, a PVA film treated with iodine may be used as the polarizer 221, and the protective layers 222a and 222b for protecting PVA films may be made from a TAC film or acrylic—for example, a PMMA film—which are stable in dimensions or against deformation, wear-resistant and high in transparency, ultraviolet absorptivity, and durability. However, the present disclosure is not limited to these materials.

Moreover, although not shown, a deformed film and a protective film may be attached to protect the polarizer 221 and protective layers 222a and 222b bonded together.

The deformed film may be attached to the outer side of the first protective layer (or inner base material) 222a until the polarizing plate 220 is attached to the final product. The protective film may be attached to the outer side of the second protective layer (or outer base material) 222b in order to prevent scratches on the surface of the polarizing plate 220 until the polarizing plate 220 is attached to the final product.

The polarizer 220 thus configured may be attached to the upper and lower sides of the liquid crystal panel. That is, the side of the polarizer 220 from which the deformed film is removed may be attached to the upper and lower sides of the liquid crystal panel.

In addition, the polarizing plate 220, when attached to the upper side of the liquid crystal panel, may include a reinforced substrate for protecting the liquid crystal panel from external impact.

The polarizing plate 220 thus according to another exemplary aspect of the present disclosure is configured to attach to the upper and lower sides of the liquid crystal panel. Although not shown, the liquid crystal panel according to an exemplary aspect of the present disclosure may include a color filter substrate, an array substrate, and a liquid crystal layer formed between the color filter substrate and the array substrate, with a cell gap maintained between them by a column spacer.

The configurations of the liquid crystal panel and liquid-crystal display device are similar to those of the foregoing exemplary aspect of the present disclosure, so descriptions of them will be omitted for convenience of explanation.

Similarly to the previously described aspect of the present disclosure, the polarizing plate 220 according to an exemplary aspect of the present disclosure is characterized in that, depending on the surface hardness of the protective layers 222a and 222b on the outer side, particularly, the second protective layer, i.e., outer base material 222b, with the protective film attached to it, the roughness and coefficient of friction of the outer base material 222b are designed, in order to improve the problem of abrasion of the polarizing plate 220 due to the reduced distance between the liquid crystal panel and the backlight unit.

As stated above, it was found out that abrasion of the polarizing plate occurs mostly because the polarizing plate is more fragile than the optical sheet, and it was also found out that the factors of abrasion of the polarizing plate in order of importance are surface hardness, roughness, and coefficient of friction.

In the present disclosure, taking these results into account, the roughness and coefficient of friction of the outer base material 222b of the polarizing plate may be designed depending on the surface hardness of the outer base material 222b, in order to prevent abrasion.

Similarly to the foregoing aspect of the present disclosure, when the outer base material 222b have a surface hardness of 5H or greater, no abrasions occur regardless of the roughness and coefficient of friction of the outer base material 222b.

When the outer base material 222b have a surface hardness of HB or less, abrasions occur regardless of the roughness and coefficient of friction of the outer base material 222b.

When the outer base material 222b has a surface hardness of 4H, the outer base material 222b may be set to a roughness less than 0.564 μm and a coefficient of friction lower than 0.064, or to a roughness of 0.434 μm or less and a coefficient of friction of 0.057 or lower, or to a roughness of 0.01 to 0.349 μm and a coefficient of friction of 0.001 to 0.027.

When the outer base material 222b has a surface hardness of 3H, the outer base material 222b may be set to a roughness less than 0.434 μm and a coefficient of friction lower than 0.057, or to a roughness of 0.349 μm or less and a coefficient of friction of 0.042 or lower, or to a roughness of 0.01 to 0.228 μm and a coefficient of friction of 0.001 to 0.018.

When the outer base material 222b has a surface hardness of 2H, the outer base material 222b may be set to a roughness less than 0.349 μm and a coefficient of friction lower than 0.042, or to a roughness of 0.228 μm or less and a coefficient of friction of 0.027 or lower, or to a roughness of 0.01 to 0.228 μm and a coefficient of friction of 0.001 to 0.009.

When the outer base material 222b has a surface hardness of H, the outer base material 222b may be set to a roughness less than 0.228 μm and a coefficient of friction lower than 0.027, or to a roughness of 0.167 μm or less and a coefficient of friction of 0.018 or lower, or to a roughness of 0.01 to 0.167 μm and a coefficient of friction of 0.001 to 0.009.

Particularly, another aspect of the present disclosure is characterized in that the surface roughness of the outer base material 222b is controlled by adding beads 230 into the outer base material 222b.

The beads 230 may be added in such a way that they are placed on the surface of the outer base material 222b.

Figure 18:
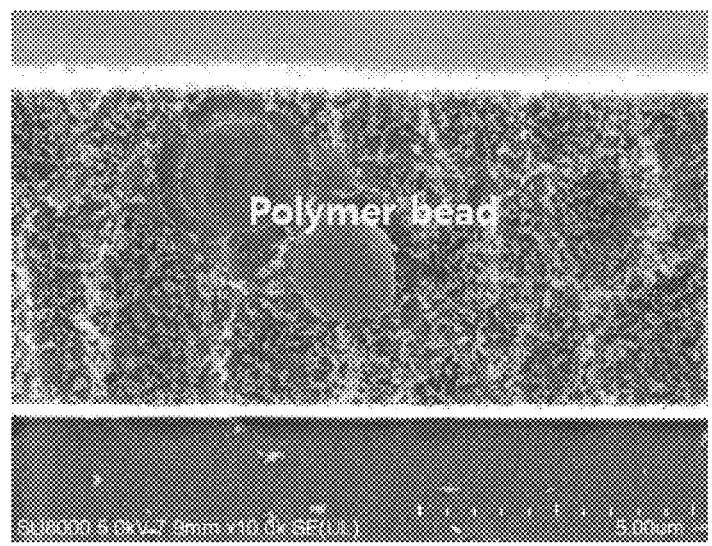
FIG. 18 is a photograph showing, by way of example, a cross-section of the outer base material roughened with added beads, in the polarizing plate of FIG. 17 according to another exemplary aspect of the present disclosure.

FIG. 18 is a photograph showing, by way of example, a cross-section of the outer base material roughened by adding beads, in the polarizing plate of FIG. 17 according to another exemplary aspect of the present disclosure.

Figure 19:
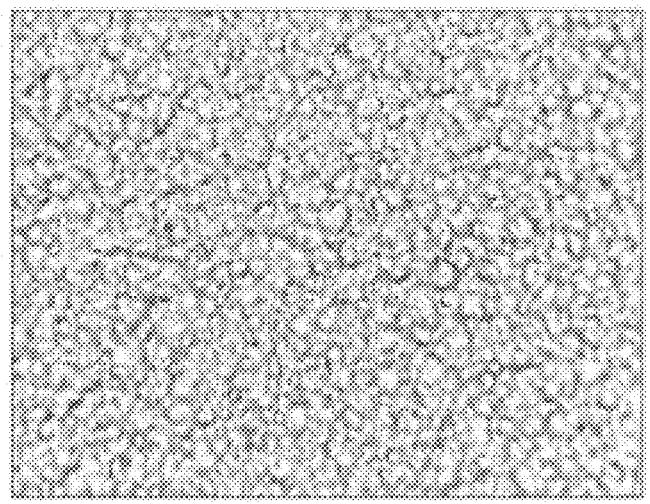
FIG. 19 is a photograph showing, by way of example, the surface of the outer base material roughened via imprinting, in the polarizing plate of FIG. 17 according to another exemplary aspect of the present disclosure.

FIG. 19 is a photograph showing, by way of example, the surface of the outer base material roughened via imprinting, in the polarizing plate of FIG. 17 according to another exemplary aspect of the present disclosure.

Referring to FIGS. 18 and 19, it can be seen that the surface of the outer base material was roughened by adding beads or via imprinting.

In this case, the beads may include polymer beads.

In the imprinting method, a roughness can be achieved by transferring a pattern onto a film surface using a patterned mold and exposing the film surface to UV light.

Although the description above contains many details, it should not be construed as limiting the scope of the disclosure but as merely providing illustrations of some exemplary aspects of the present disclosure. Thus, the scope of the present disclosure should be determined by the appended claims and their equivalents, rather than by the examples given.

What is claimed is:

1. A liquid-crystal display device, comprising:
a liquid crystal panel;
a polarizing plate attached on a lower side of the liquid crystal panel; and an optical sheet below the polarizing plate with a gap therebetween, wherein the polarizing plate comprises a polarizer; and a protective layer directly provided on a lower side of the polarizer, wherein the optical sheet includes a diffuser sheet and a prism sheet, wherein the diffuser sheet faces the protective layer, wherein the protective layer has a surface hardness of H1 between H and 4H, a roughness and a coefficient of friction of the protective layer are determined depending on the surface hardness of the protective layer and the diffuser sheet has a surface hardness of H2, wherein H is the lowest hard density and 6H is the greatest hard density, and wherein the protective layer has fluorine content of 0.1 to 1.0 wt %, and wherein a roughness difference between the protective layer and the diffuser sheet is at least 2.96 when H1−H2=H, at least 3.0 when H1=H2, at least 3.15 when H2−H1=H and at least 3.27 when H2−H1=2H to prevent abrasion on the polarizing plate.

2. The liquid-crystal display device of claim 1, wherein the protective layer has a surface hardness of 4H, a roughness less than 0.564 μm and a coefficient of friction lower than 0.064.

3. The liquid-crystal display device of claim 1, wherein the protective layer has a surface hardness of 4H, a roughness of 0.434 μm or less and a coefficient of friction of 0.057 or lower.

4. The liquid-crystal display device of claim 1, wherein the protective layer has a surface hardness of 4H, a roughness of 0.01 to 0.349 μm and a coefficient of friction of 0.001 to 0.027.

5. The liquid-crystal display device of claim 1, wherein the protective layer has a surface hardness of 3H, a roughness less than 0.434 μm and a coefficient of friction lower than 0.057.

* * * * *